US010691896B2

(12) United States Patent
Johnson, Jr. et al.

(10) Patent No.: US 10,691,896 B2
(45) Date of Patent: *Jun. 23, 2020

(54) CONVERSATIONAL SYSTEM USER BEHAVIOR IDENTIFICATION

(71) Applicant: Microsoft Technology Licensing, LLC, Redmond, WA (US)

(72) Inventors: Joseph Edwin Johnson, Jr., Seattle, WA (US); Emmanouil Koukoumidis, Kirkland, WA (US); Donald Brinkman, Seattle, WA (US); Matthew Schuerman, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/149,211

(22) Filed: Oct. 2, 2018

(65) Prior Publication Data

US 2019/0034411 A1 Jan. 31, 2019

Related U.S. Application Data

(63) Continuation of application No. 15/581,969, filed on Apr. 28, 2017, now Pat. No. 10,120,866.

(51) Int. Cl.
| G10L 15/00 | (2013.01) |
| G06F 40/35 | (2020.01) |
| G10L 25/63 | (2013.01) |
| G06N 3/00 | (2006.01) |
| G06Q 10/10 | (2012.01) |
| G06N 5/04 | (2006.01) |

(52) U.S. Cl.
CPC .............. *G06F 40/35* (2020.01); *G06N 3/006* (2013.01); *G06Q 10/1053* (2013.01); *G10L 25/63* (2013.01); *G06N 5/045* (2013.01)

(58) Field of Classification Search
CPC ........ G10L 15/065; G10L 15/07; G10L 15/22
USPC .......................................................... 704/10
See application file for complete search history.

(56) References Cited

U.S. PATENT DOCUMENTS

| 9,502,030 | B2* | 11/2016 | Winter | .................... G10L 15/22 |
| 9,558,739 | B2* | 1/2017 | Sims, III | ................ G10L 15/065 |
| 2006/0229873 | A1* | 10/2006 | Eide | ........................ G10L 13/027 |
| | | | | 704/260 |
| 2007/0213981 | A1* | 9/2007 | Meyerhoff | .............. G10L 17/26 |
| | | | | 704/243 |
| 2010/0088088 | A1* | 4/2010 | Bollano | ................ G10L 15/065 |
| | | | | 704/201 |

* cited by examiner

Primary Examiner — Daniel Abebe

(57) ABSTRACT

Examples of the present disclosure describe systems and methods relating to conversational system user behavior identification. A user of the conversational system may be evaluated based on one or more factors. The one or more factors may be compared to an aggregated measure for a larger group of conversational system users, such that "anomalous" behavior (e.g., behavior that deviates from a normal behavior) may be identified. When a user is identified as exhibiting anomalous behavior, the conversational system may adapt its interactions with the user in order to encourage, discourage, or further observe the identified behavior. As a result, the conversational system may be able to verify a user's anomalous behavior, discourage the anomalous behavior, or take other action while interacting with the user.

20 Claims, 9 Drawing Sheets

CONVERSATIONAL SYSTEM USER BEHAVIOR IDENTIFICATION

CROSS-REFERENCE TO RELATED APPLICATIONS

This application is a continuation application of U.S. patent application Ser. No. 15/581,969 (now U.S. Pat. No. 10,120,866), entitled "CONVERSATIONAL SYSTEM USER BEHAVIOR IDENTIFICATION," filed on Apr. 28, 2017, the entire disclosure of which is hereby incorporated herein by reference.

BACKGROUND

A conversational system may communicate with many different types of users. While the conversational system may be well-suited to process a large group or even a majority of users, there may be a subset of users of the conversational system that should receive additional or alternative processing.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods relating to conversational system user behavior identification. A user of the conversational system may be evaluated based on one or more factors. The one or more factors may be compared to an aggregated measure for a larger group of conversational system users, such that "anomalous" behavior (e.g., behavior that deviates from an observed normal behavior) may be identified. In some examples, multiple factors may be evaluated and/or weighted when generating a behavior measure. One or more thresholds may be used when comparing the user to the larger group, such that, if the behavior is determined to be outside of the threshold, the behavior may be identified to be anomalous.

When a user is identified as exhibiting anomalous behavior, the conversational system may adapt its interactions with the user in order to encourage, discourage, or further observe the identified behavior. As a result, the conversational system may be able to verify a user's anomalous behavior by adapting its behavior accordingly. In some examples, the conversational system may be able to discourage anomalous behavior by introducing one or more challenges into the normal operation of the conversational system, thereby making it less convenient or appealing to be an anomalous user. In other examples, if the user continues to exhibit anomalous behavior, additional actions may be performed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
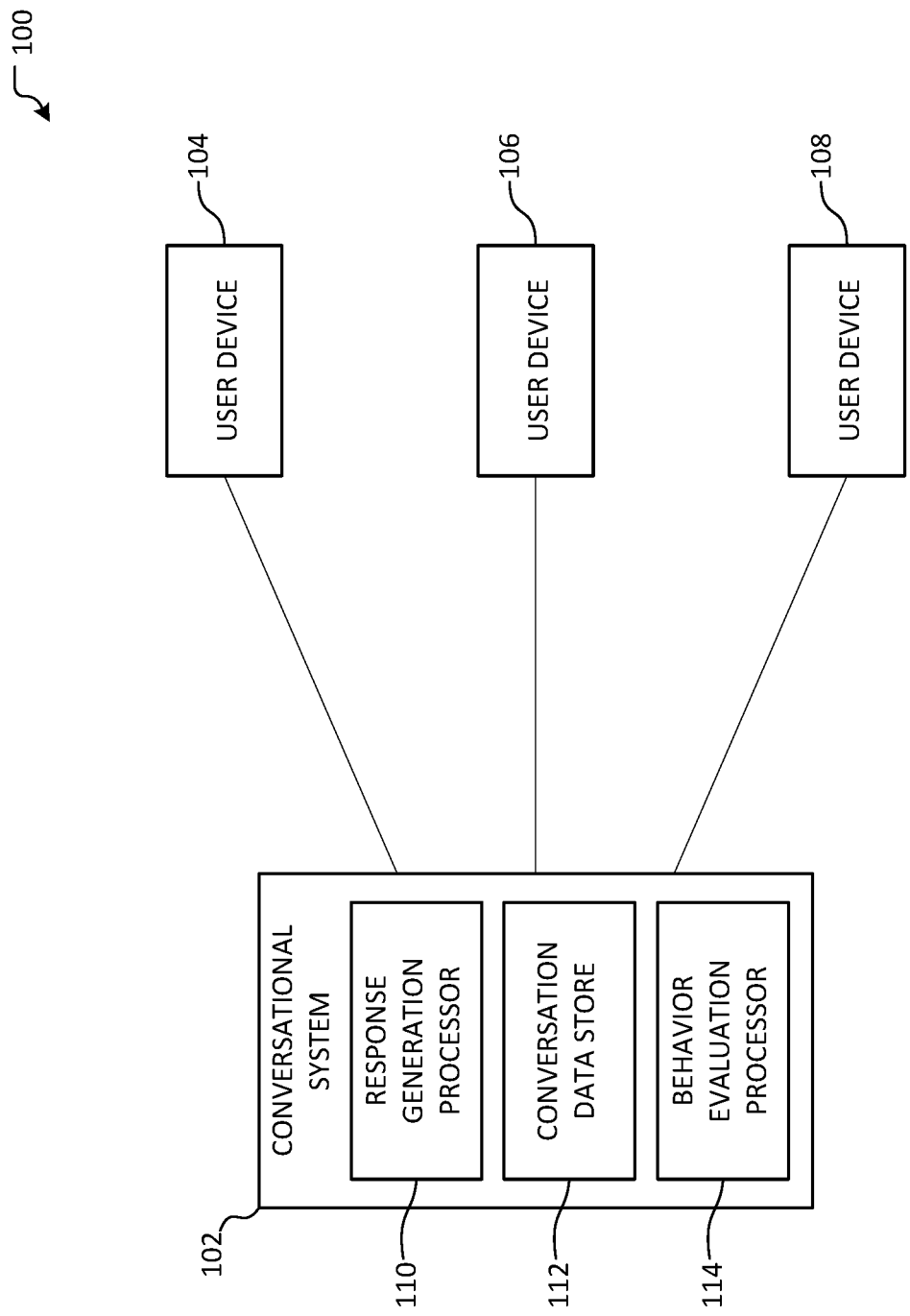
FIG. 1 illustrates an overview of an example system for conversational system user behavior identification.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In a conversational system, a variety of users may engage with an electronic conversational agent, each via one or more user devices. In an example, a user may be a human user, an electronic user (e.g., an automated conversation entity such as a chat robot or other electronic system), or any other user of the conversational system. A user may engage with the electronic conversational agent for a variety of reasons or may exhibit an array of behaviors. In some examples, a user may exhibit an "anomalous" behavior as compared to other users of the conversational system, such that the user may be determined to be associated with a certain category or type of users.

As an example, a category of users may engage with the conversational system for the purpose of misusing or disrupting the operation of the conversational system. Another example category may be comprised of users that aim to misappropriate content from the conversational system for unintended use (e.g., to generate a catalog of responses from the electronic conversational agent, to relay responses from the electronic conversational agent to a user outside of the conversational system, etc.). While example categories are discussed herein, it will be appreciated that other categories may exist or be identified according to aspects disclosed herein.

Identifying anomalous behavior may comprise analyzing one or more factors associated with an interaction between a user and the electronic conversational agent. Example factors may include conversation attributes (e.g., length, frequency, average quantity of messages per conversation, etc.), substantive attributes (e.g., variance of topics discussed, communication relevance, conversation vocabulary, language consistency, etc.), or user attributes (e.g., detected emotions, perceived intelligence or problem-solving abilities, etc.), among other factors. Analysis of such factors may be performed based on anonymized data, such that user-specific information may be associated with an identifier rather than the user. In some examples, personal information may be removed or omitted.

A conversation attribute may be used as a factor, wherein the message length, message frequency (e.g., how many messages per response or turn, etc.), or average quantity of messages per conversation may be evaluated, among other attributes. In some examples, response time may be considered, wherein the amount of time between a user receiving a message and the user providing a response may be analyzed. In other examples, usage patterns may be evaluated, such as average conversation duration, common conversation times, etc.). While example conversation attributes have been provided, it will be appreciated that other conversation attributes may be evaluated according to aspects disclosed herein without departing from the spirit of this disclosure.

Conversational relevance may be used as a factor, wherein a response received from a user may be analyzed to determine a relevance in relation to the previous communication of the electronic conversational agent. In an example, relevance may be determined based on word embeddings, a topic graph, or other technique. In some examples, a relevance ratio may be computed, indicating a ratio of relevant responses to responses that are determined to be less relevant. A response may be categorized based on a threshold, wherein a certain level of relevance may be determined to be relevant when computing the ratio, while a relevance level below the threshold may be determined to be not relevant. With respect to a group of users using a conversational system, a relevance ratio may exhibit different characteristics depending on the nature of the conversational system. As an example, an "open-ended" conversational system (e.g., wherein the domain of conversation is not restricted or is more variable) may exhibit a lower average relevance ratio as compared to a "closed" conversational system (e.g., a conversational system having a more-defined conversation domain as compared to an open-ended system. In some examples, a confidence level may be evaluated when determining relevance, wherein an electronic conversational agent response that is associated with a lower confidence for correctness may not be as determinative as a response associated with a higher confidence.

In another example, user vocabulary or language features (e.g., use of idioms, unique word spellings, specific subsets of words, etc.) may be evaluated as factors. For example, one or more conversation sessions may be evaluated for consistency, such that the presence of varying language features (e.g., alternating between "color" and "colour", etc.) may be a factor. In some examples, a group of language features may be evaluated as a factor, such that certain features may be expected based on the presence of other features (e.g., based on a spelling of "colour," it may be expected that the user would use a similar spelling for other words). In other examples, a set of words may be determined to be associated with a cohort of users, such that an increased presence of such words as compared to a more general population may indicate that the user is likely to be a part of the cohort of users.

User progression in a conversation may be evaluated as a factor. In an example, a conversation may comprise a plurality of levels (e.g., a progression of questions, a series of stories, etc.). In order to progress to a subsequent level, the user may need to provide an answer or other message having an expected characteristic (e.g., relating to a certain domain, having a certain length, etc.). As an example, a user that is providing random responses to the electronic conversational agent would be unlikely to progress as far through the plurality of levels as a user that is providing legitimate responses. Accordingly, additional information may be determined about the user based on how far the user progresses in the conversation.

In some examples, a behavior measure may be generated using a macro-level analysis of historical information in order to identify a trend, average, or other characteristic associated with a factor. The macro-level analysis may comprise an analysis of a user in view of a larger group of users of the conversational system. As an example, historical conversations associated with a user may be compared to a statistical distribution for a larger group of users to determine a deviation for a user's behavior from the mean of the group. In other examples, a behavior measure may be generated using a micro-level analysis, such that a factor relating to a conversation session between a user and an electronic conversational agent may be analyzed during or soon after the conversation session. The micro-level analysis may comprise analyzing a user's behavior in the conversation session as compared to a larger group of users of the conversational system (e.g., as may have been determined by performing a macro-level analysis).

When evaluating a user's behavior measure, a threshold may be used. As an example, the threshold may be based on the degree to which the behavior measure deviates from the larger group. In some examples, the behavior measure may be based on the combination of factors, which may be compared to a single threshold. The combination of factors may be used to generate a model indicative of an average user of the conversational system, such that the resulting behavior measure may be compared to a threshold to determine whether the user's behavior is average (e.g., within a given threshold) or anomalous. In other examples, factors may be weighted differently, such that certain factors may have increased or reduced influence on the generated a behavior measure for a user. While example comparisons are discussed above, it will be appreciated that any number or type of factors may be compared to any number or type of thresholds.

If a user's behavior is determined to be anomalous, the conversational system may adapt the electronic conversational agent to further evaluate the behavior. In an example, adapting the electronic conversational agent may comprise engaging with the user in a manner intended to encourage, discourage, or further observe the anomalous behavior. As an example, if it is determined that the anomalous behavior may indicate that the user is a chat robot (e.g., as a result of having an abnormally low response time as compared to other users of the conversational system, etc.), the electronic conversational agent may stop responding to the user in order to determine whether the user will transmit another message without first receiving a message. In another example, if the user is determined to potentially belong to a cohort of users, the electronic conversational agent may be adapted to better conform to the cohort. For example, if the user is identified to have an affinity for anime or another popular subculture, the electronic conversational agent may be adapted to have discussions comprising topics, terminology, and/or phrases that are common within the subculture.

In some examples, the electronic conversational agent may provide a challenge or other interaction with a user such that, depending on how the user reacts to the challenge, a determination may be made about the user. For example, the electronic conversational agent may present a challenge designed to distinguish between a human user and an electronic user (e.g., a Turing test, a challenge that is computationally intensive, etc.). Input received from the challenge may be used to generate or gather data. In an example, the challenge may comprise a plurality of parts, wherein a part of the challenge may have a known or expected response, while another part may be unknown. A response may be compared based on the part having the known or expected response, such that if the response matches or is similar to the known or expected response, information may be determined for one or more of the remaining parts of the challenge.

In other examples, the electronic conversational agent may guide a conversation with a user, such that a topic may be discussed and used to assess whether the user is providing consistent responses. As an example, the electronic conversational agent may ask a user whether the user likes poodles, and may subsequently ask whether the user likes dogs. If the user indicates an affinity for poodles but not dogs, it may be possible to determine additional information about the user. In another example, similar prompts may be presented, such that inconsistent answers to the similar questions may be used to determine additional information about the user. One or more such inconsistencies may be used to determine that the user is providing random or unrelated responses in the guided conversation. The determination may provide an indication that the user is an electronic user, a disruptive user, or other category of user. It will be appreciated that a conversational agent may be adapted using additional or alternative techniques according to aspects disclosed herein without departing from the spirit of this disclosure.

According to aspects disclosed herein, a conversational session between an electronic conversational agent and a user may occur for a variety of reasons (e.g., for social or recreational reasons, for customer support, for research, etc.). In an example, a conversational session may be an interview, wherein the electronic conversational agent is an interviewer and the user is an interviewee. In some examples, the electronic conversational agent may be one of a plurality of interviewers present during a conversational session. The electronic conversational agent may engage with the user according to aspects disclosed herein to determine whether the user may be a potential candidate for a job position. In an example, the determination may comprise evaluating a variety of criteria relating to the job position, the company at which the job position is available, or other criteria relating to employment characteristics. If the user is identified as a potential candidate (e.g., as compared to one or more thresholds or using logic), the user may progress to additional screening (e.g., subsequent interviews, a background check, etc.) or may be hired. Alternatively, if the user is identified to not be a potential candidate, the user may be informed accordingly or may be the subject of additional evaluation, among other examples.

FIG. 1 illustrates an overview of an example system 100 for conversational system user behavior identification. System 100 comprises conversational system 102 and user devices 104-108. In an example user devices 104-108 may be personal computing devices, mobile computing devices, tablet computing devices, cellular communication devices, or a combination thereof, among other devices. User devices 104-108 may be used by users of conversational system 102. In some examples, user devices 104-108 may communicate with conversational system 102 using a network (e.g., the Internet, a local area network, a telephone communication network, etc.). In other examples, user devices 104-108 may communicate with conversational system 102 using a service, such as an instant messaging service or other electronic communication service. User devices 104-108 may be used by or under the control of any type of user described herein, including, but not limited to, human users, electronic users, or any combination thereof.

Conversational system 102 may be any of the devices described above, or may be a distributed computing device comprised of any number of devices, which may be used to provide elements 110-114. Conversational system 102 comprises response generation processor 110, conversation data store 112, and behavior evaluation processor 114. In an example, one or more of elements 110-114 may be used by conversational system 102 to provide an electronic conversational agent to user devices 104-108. While system 100 is illustrated as having one conversational system 102 with three user devices 104-108, it will be appreciated that a conversational system may have any number of users and any number of conversational systems and/or electronic conversational agents may be used.

Response generation processor 110 may receive and transmit messages to user devices 104-108, thereby engaging in communication with users of user devices 104-108. Response generation processor 110 may receive messages from one or more of user devices 104-108 in any of a variety of formats, including, but not limited to, in text format, as an audio file, as a video stream, or any combination thereof. In some examples, different formats may be used by different user devices (e.g., user device 104 may communicate in a text format, while user device 106 may communicate using audio files). Based on a received message, response generation processor 110 may process the message to generate a response. In an example, generating a response may comprise identifying, from a set of potential responses, a relevant response as compared to the received message. In another example, generating a response may comprise determining a domain associated with the message and performing additional processing of the message based on the determined domain. Response generation processor 110 may provide a generated response to a user device in a similar or different format as compared to the format of the received message. While example operations are discussed above with respect to response generation processor 110, it will be appreciated that any of a variety of operations may be used when generating a response to received input.

Conversation data store 112 may store conversation history, conversation metadata, or other information relating to or used by conversational system 102. In an example, conversation data store 112 may comprise a local storage device or a database, among other local storage systems. In another example, conversation data store 112 may comprise a remote storage system, including, but not limited to, a distributed storage system or a networked storage device. In some examples, at least a part of the information stored by conversation data store 112 may be anonymized, omitted, or otherwise altered so as to protect the identities of users of conversational system 102. In other examples, conversation data store 112 may store information used or generated by behavior evaluation processor 114, which will be discussed in greater detail below.

Behavior evaluation processor 114 may evaluate user behavior exhibited during a conversation session between one or more of user devices 104-108 and conversational system 102. In an example, response generation processor 110 may provide information to behavior evaluation processor 114 during or soon after a conversation session. In another example, behavior evaluation processor 114 may access information from conversation data store 112. As described herein, behavior evaluation processor 114 may evaluate one or more factors using received and/or accessed information in order to generate a behavior measure. The evaluation may comprise evaluating the factor based on information associated with a group of users of conversational system 102, such that an average, a probability distribution, or other measure may be determined for the group. Information associated with a user or a subpart of the group of users may then be compared accordingly in order to generate the behavior measure. The behavior measure may then undergo a threshold analysis, such that a certain deviation from the group may be deemed anomalous.

In some examples, behavior evaluation processor 114 may evaluate multiple factors when generating a behavior measure. As an example, a probability distribution may be generated for each of a plurality of factors, each of which may then be compared to individual user data and aggregated to generate a behavior measure. In examples, the aggregation may comprise weighting the factors such that certain factors may have more influence on the generated behavior measure than other factors. In examples, behavior evaluation processor 114 may evaluate current conversation session information (e.g., as may have been received from response generation processor 110), past conversation session information (e.g., as may be stored by conversation data store 112), or any combination thereof.

Figure 2:
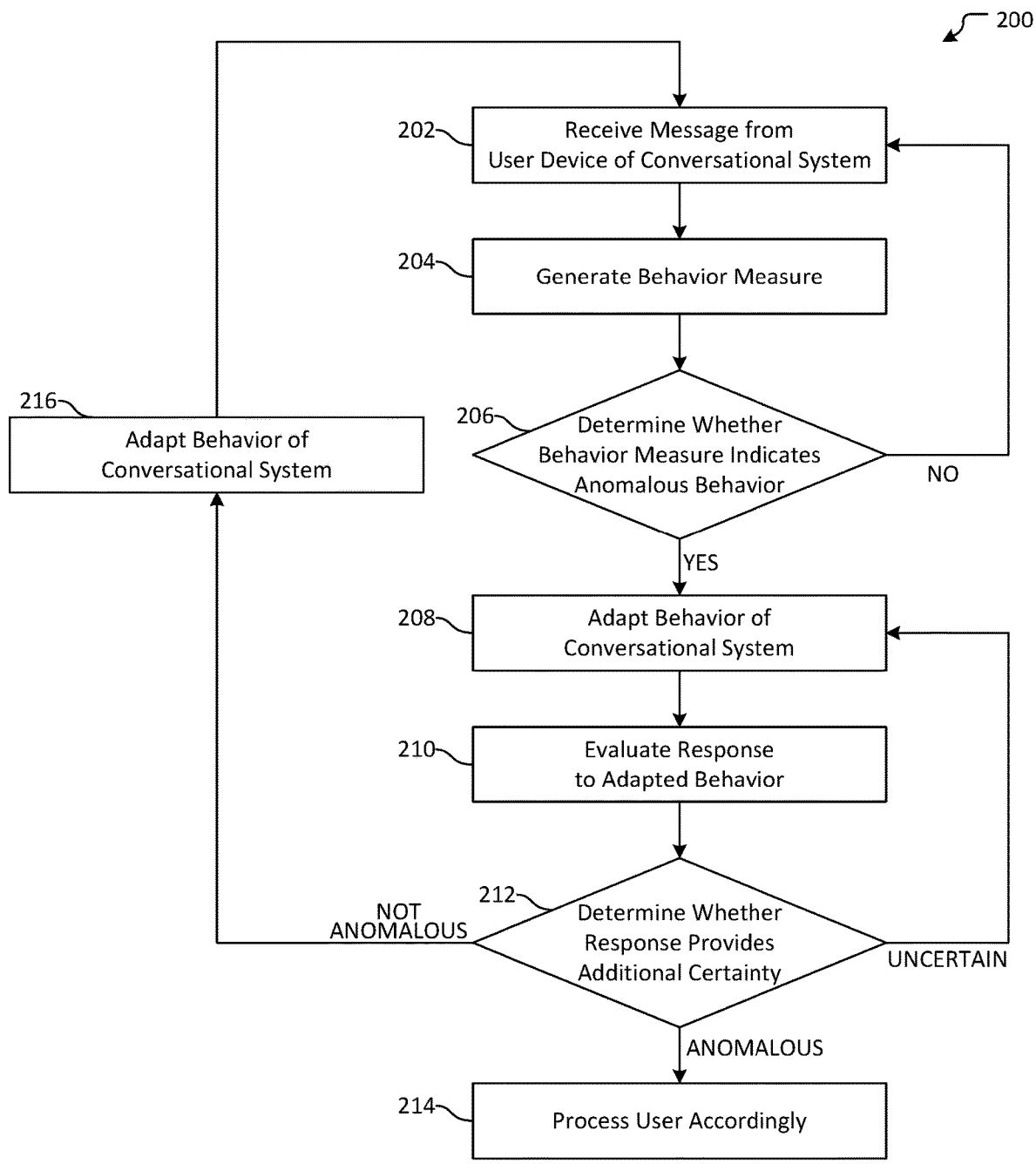
FIG. 2 illustrates an overview of an example method for conversational system user behavior identification.

FIG. 2 illustrates an overview of an example method 200 for conversational system user behavior identification. In an example, method 200 may be performed by a conversational system, such as conversational system 102 in FIG. 1. Aspects of method 200 may be performed by one or more computing devices, including, but not limited to, a mobile computing device, a personal computing device, a tablet computing device, a server computing device, or a distributed computing device or system. Method 200 begins at operation 202, where a message from a user device of a conversational system may be received. The user device may be one of user devices 104-108 in FIG. 1. The message may be received by an electronic conversational agent of the conversational system. In an example, the message may be received at response generation processor 110 in FIG. 1.

At operation 204, a behavior measure may be generated based on the message. Aspects of generating a behavior measure will be discussed in greater detail below with respect to FIG. 3. In an example, generating the behavior measure may comprise evaluating one or more factors associated with the message, a conversation associated with the message, or a past conversation associated with the user, or any combination thereof. A factor for the user may be compared to an aggregate factor measure of a group of users of the conversational system in order to generate the behavior measure. As a result, a behavior measure may indicate a user's deviation from a larger group with respect to one or more factors.

Moving to determination 206, it may be determined whether the behavior measure indicates anomalous behavior. In an example, the determination may comprise evaluating the generated behavior measure in view of one or more thresholds. A threshold may indicate a range, such that if a given behavior measure deviates from a larger group beyond the specified range, the behavior measure may be determined to be anomalous. In another example, the determination may comprise evaluating logic based on the behavior measure. While example techniques are discussed herein, it will be appreciated that a behavior measure may be analyzed using any of a variety of techniques to identify anomalous behavior.

If, at determination 206, it is determined that the behavior measure does not indicate anomalous behavior, flow branches "NO" to operation 202, where flow may loop between operations 202, 204, and 206. In an example, the electronic conversational agent may continue to operate normally, such that subsequent messages may be evaluated in order to monitor for anomalous behavior. If, however, it is determined at determination 206 that the behavior measure indicates anomalous behavior, flow instead branches "YES" to operation 208, where the behavior of the conversational system may be adapted.

As will be discussed in greater detail below with respect to FIG. 4, adapting the behavior of the conversational system may comprise engaging with the user in a manner intended to encourage, discourage, or further observe the anomalous behavior. As an example, the conversational agent may alter one or more characteristics of its communication with the user, such as increasing response time, increasing message length, decreasing topic variability, etc. In another example, a specialized processor may be used to engage with the user. The specialized processor may be similar to the electronic conversational agent, but may have domain-specific knowledge or other specialized attributes. In some examples, the conversational agent may present a challenge to the user, such as a challenge designed to determine whether the user is a human or an electronic user, or a challenge designed to generate data based on a user input.

At operation 210, a user response to the adapted behavior may be evaluated. In an example, evaluating the user response may comprise generating a new behavior measure based on the user response according to aspects disclosed herein. In another example, evaluating the response may comprise evaluating a challenge response or analyzing the received user response based on an expected response. While example adaptations and evaluations are described herein, it will be appreciated that a wide variety of potential adaptations and evaluations may be used by a conversational system.

Moving to determination 212, it may be determined whether the response provides additional certainty with respect to the identified anomalous behavior. The determination may be based on the evaluation performed at operation 210. As an example, the determination may be based on whether a subsequent behavior measure indicates a greater anomaly than the initial behavior measure. In some examples, the subsequent behavior measure may be evaluated based on a threshold, either in relation to the initial behavior measure or in relation to an average or other probabilistic measure. In another example, the determination may be based on whether the user provided the expected response to a challenge. It will be appreciated that the determination may be based on any of a variety of criteria.

In some examples, there may not be additional certainty, or the level of certainty may be below a certainty threshold. As a result, flow branches "UNCERTAIN" to operation 208, where flow may loop between operations 208, 210, and 212 until the presence of an anomaly is more certain (e.g., such that it may be determined whether the behavior is anomalous or not anomalous, etc.). If, in another example, it is determined that the behavior is anomalous, flow branches to operation 214. At operation 214, the user may be processed accordingly. In an example, processing the user may comprise removing the user from the conversational system, further adapting the electronic conversational agent, processing the user using a different electronic conversational agent, or providing a warning or other indication to the user. In another example, processing the user may comprise providing an indication to an administrator of the conversational system, such that the administrator may subsequently investigate the user's behavior in order to verify the anomaly and take action accordingly. It will be appreciated that a user identified as anomalous may be processed using any of a variety of techniques without departing from the spirit of this disclosure. Flow terminates at operation 214.

If, however, it is determined at determination 212 that the response provides certainty that the behavior is not anomalous, flow branches "NOT ANOMALOUS" to operation 216. At operation 216, the behavior of the conversational system may be adapted. In an example, adapting the conversational system at operation 216 may comprise reverting at least one aspect of the conversational system behavior that was changed by the adaptation that occurred at operation 208. In another example, adapting the behavior of the conversational system may comprise whitelisting the user or adapting the electronic conversational agent to resume normal operation. It will be appreciated that adapting the conversational system may comprise any of a variety of operations, which may be similar or different to those discussed above with respect to operation 208. After operation 216, flow may return to operation 202, where flow may loop between operations 202-216 during a conversation session between the user and the conversational system.

Figure 3:
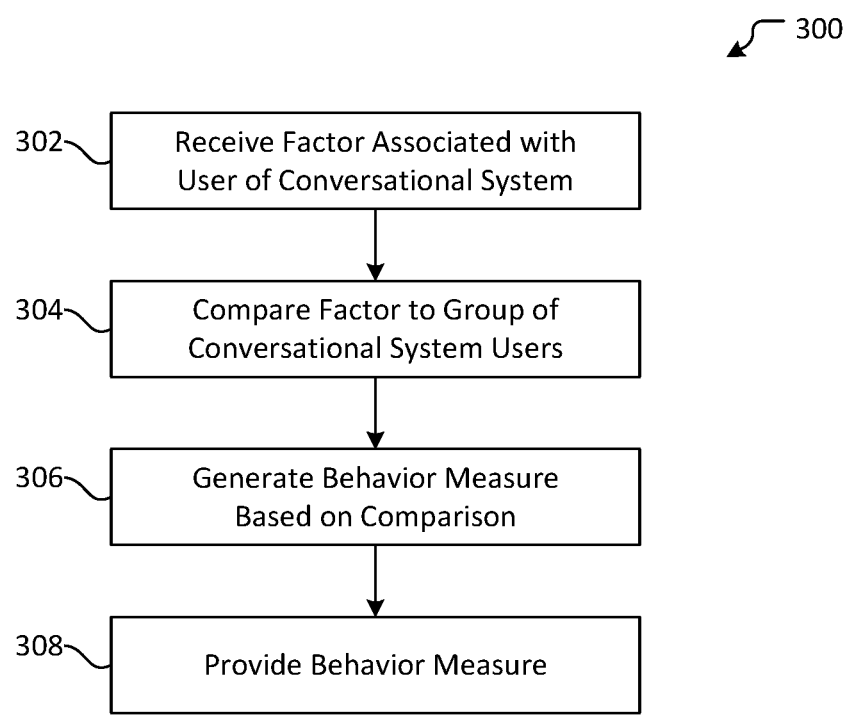
FIG. 3 illustrates an overview of an example method for behavior measure generation.

FIG. 3 illustrates an overview of an example method 300 for behavior measure generation. Method 300 may be performed by a conversational system. In some examples, aspects of method 300 may be performed by behavior conversation data store 112 and/or evaluation processor 114 in FIG. 1. Method 300 begins at operation 302, where a factor associated with a user of a conversational system may be received. The factor may be received from an electronic conversational agent, provided by a response generation processor (e.g., response generation processor 110 in FIG. 1), or accessed from a storage system (e.g., conversation data store 112 in FIG. 1), among other sources. As discussed above, the factor may relate to conversation attributes, substantive attributes, or user attributes, among other factors.

At operation 304, the factor may be compared to a group of conversational system users. The comparison may comprise comparing the factor for the user to a distribution or other measure relating to the factor for the group of conversational system users. In an example, the group of users may be a subset of users, such as users in a certain demographic, geographic region, or having an interest associated with a certain domain. In another example, the group of users may be substantially all of the conversational system users. In some examples, the group may be based on users who have been identified to be anomalous. As a result, a comparison of the user to the group may be based on a similarity (e.g., within a threshold deviance) rather than a difference (e.g., greater than a threshold deviance) to identify a behavior as anomalous.

Moving to operation 306, a behavior measure may be generated based on the comparison. Generating the behavior measure may comprise weighting the comparison performed at operation 304. In another example, the behavior measure may be generated based on other information, such as one or more other comparisons between a user factor and a group of users. The behavior measure may be evaluated based on a threshold, according to aspects disclosed herein. The threshold may be updated or adjusted according to a variety of factors, including, but not limited to, a percentage of users identified as anomalous, an updated probability distribution for the factor, the group to which the user is being compared, etc. At operation 308, the behavior measure may be provided. In an example, providing the behavior measure may comprise providing a threshold with which to compare the behavior measure. The behavior measure may be provided to an electronic conversational agent, to a behavior evaluation processor (e.g. behavior evaluation processor 114 in FIG. 1), or stored in a data store (e.g., conversation data store 112). Flow terminates at operation 308.

Figure 4:
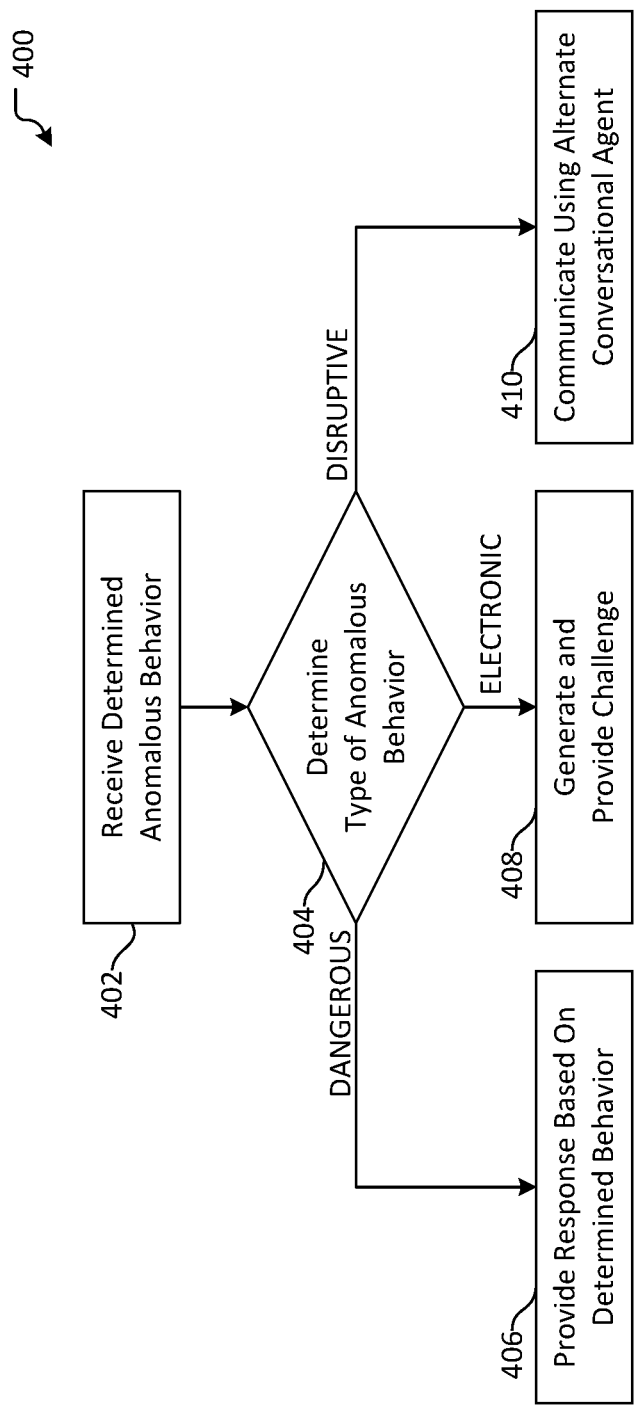
FIG. 4 illustrates an overview of an example method for adapting the behavior of a conversational system.

FIG. 4 illustrates an overview of an example method 400 for adapting the behavior of a conversational system. In an example, method 400 may be performed by a conversational system, such as conversational system 100 in FIG. 1. Method 400 begins at operation 402, where a determined anomalous behavior may be received. The anomalous behavior may be received from behavior evaluation processor 114 in FIG. 1. In some examples, the anomalous behavior may have been determined by performing one or more operations of methods 200 and 300 in FIGS. 2 and 3, respectively.

At determination 404, the type of anomalous behavior may be determined. Determining the type of anomalous behavior may comprise evaluating one or more factors associated with a user to determine which type of behavior is most likely to be associated with the factors. As an example, if a user is associated with factors indicating abnormally rapid response times and a high number of messages per conversation, the factors may be determined to be associated with an electronic user. In another example, if a user is associated with factors indicating a high variability of topics or rapid emotional swings, the factors may be determined to be associated with a disruptive user. In some examples, a user may be determined to be associated with an aggressive or harmful vocabulary, exhibit emotional negativity, have a lack of emotional variety, or topics of conversations with the user may be associated with topics that are typically termed "dangerous." Accordingly, the user may be determined to be dangerous.

As such, if it is determined at determination 404 that the user is dangerous, flow branches "DANGEROUS" to operation 406, where the conversational system may be adapted to provide a response based on the determined behavior. The response may be intended to provide support to the user. In some examples, adapting the conversational system may comprise taking action to limit the effect of the user on the conversation session, including, but not limited to, removing the user from the conversational system, muting the user, or attempting to correct the identified behavior (e.g., if the user is identified to exhibit emotional negativity, the electronic conversational agent may be adapted to provide upbeat conversation, among other examples). Flow terminates at operation 406. In another example, if it is determined at determination 404 that the user is an electronic user, flow branches "ELECTRONIC" to operation 408, where a challenge may be generated and provided, according to aspects disclosed herein. The challenge may be used to verify whether the user is in fact an electronic user, as the challenge may not be easily solvable by an electronic user. Flow terminates at operation 408. In yet another example, if it is determined at determination 404 that the user is disruptive, flow branches "DISRUPTIVE" to operation 410, where an alternate electronic conversational agent may be used to communicate with the user. In an example, the alternate electronic conversational agent may provide a limited set of topics that may be discussed with the user. In another example, the alternate electronic conversational agent may use different vocabulary or provide responses that are less reactive or emotive. In some examples, rather than or in addition to using an alternate electronic conversational agent, an electronic conversational agent that is already engaged with the user may be adapted. Flow terminates at operation 410.

While example adaptations have been discussed with respect to FIG. 4, it will be appreciated that other adaptations for any of a variety of behavior types may be performed according to aspects disclosed herein. Further, while each type has been discussed with respect to one adaptation, it will be appreciated that any number of adaptations may be performed for a given type. In some examples, multiple adaptations may be performed over time, such that the conversation system may be progressively adapted depending on the behavior measure associated with the user.

FIGS. 5-8 and the associated descriptions provide a discussion of a variety of operating environments in which aspects of the disclosure may be practiced. For example, user devices 104, 106, and 108, conversational system 102, and methods 200, 300, and 400 may be implemented by one or more of the computing devices and systems described in FIGS. 5-8. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
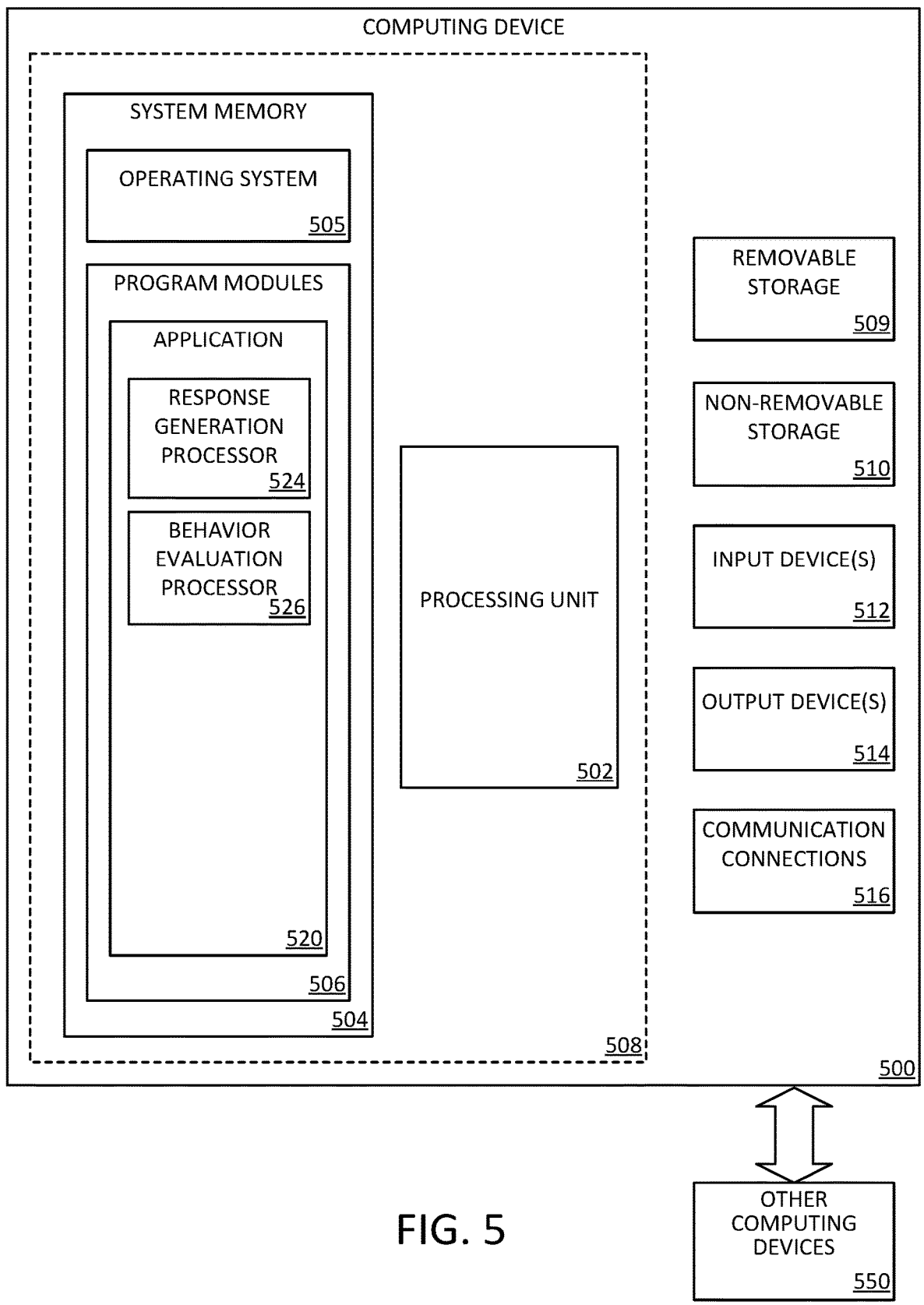
FIG. 5 is a block diagram illustrating example physical components of a computing device with which aspects of the disclosure may be practiced.

FIG. 5 is a block diagram illustrating physical components (e.g., hardware) of a computing device 500 with which aspects of the disclosure may be practiced. The computing device components described below may be suitable for the computing devices described above. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories. The system memory 504 may include an operating system 505 and one or more program modules 506 suitable for performing the various aspects disclosed herein such as response generation processor 524 and behavior evaluation processor 526. The operating system 505, for example, may be suitable for controlling the operation of the computing device 500. Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
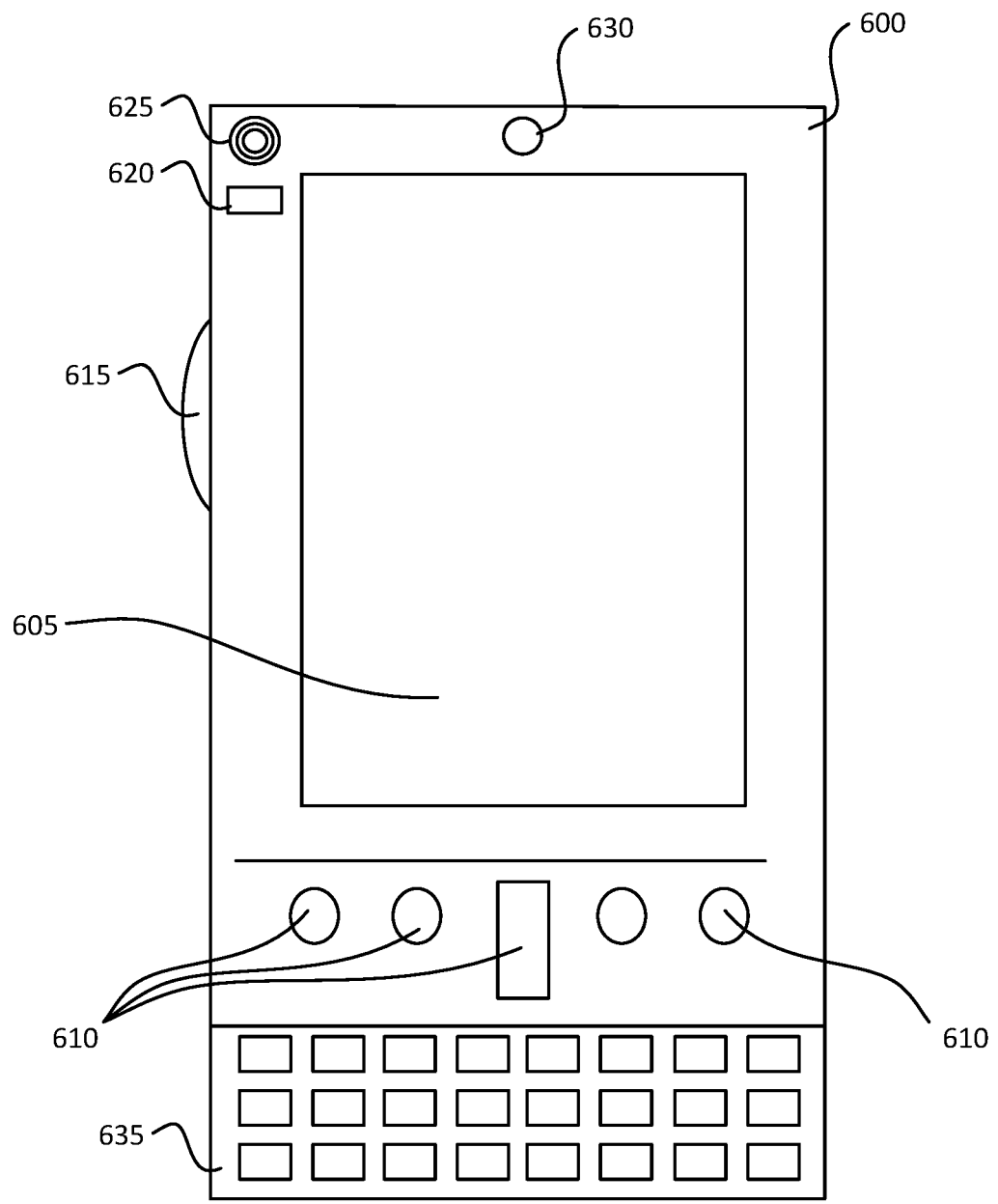
FIGS. 6A and 6B are simplified block diagrams of a mobile computing device with which aspects of the present disclosure may be practiced.
Figure 6B:
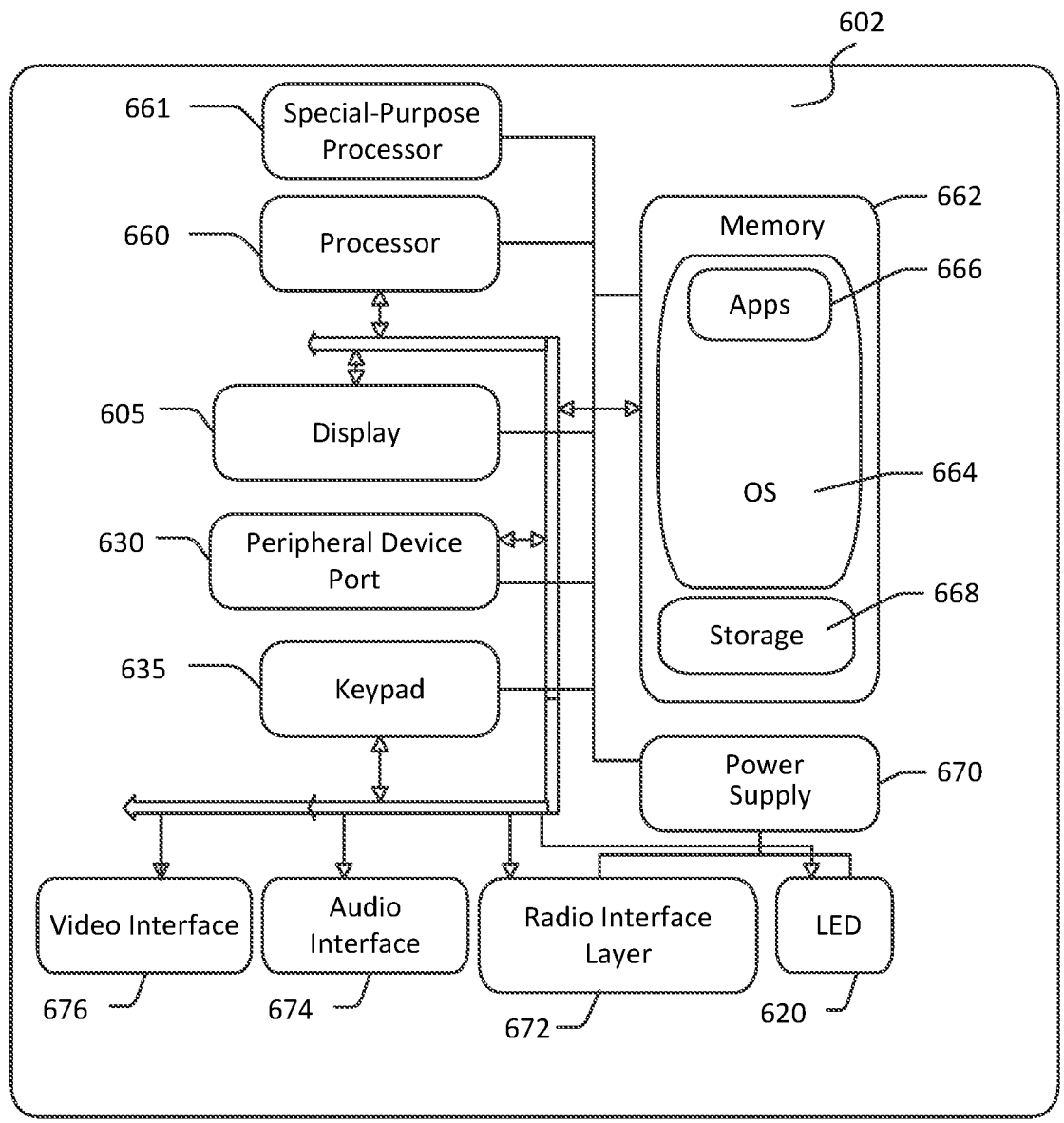

FIGS. 6A and 6B illustrate a mobile computing device 600, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 6A, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600 described herein (e.g., search engine, extractor module, relevancy ranking module, answer scoring module, etc.).

The system 602 has a power supply 670, which may be implemented as one or more batteries. The power supply 670 might further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio interface layer 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio interface layer 672 or via a distributed computing network. Similarly, such data/information may be readily transferred between computing devices for storage and use according to well-known data/information transfer and storage means, including electronic mail and collaborative data/information sharing systems.

Figure 7:
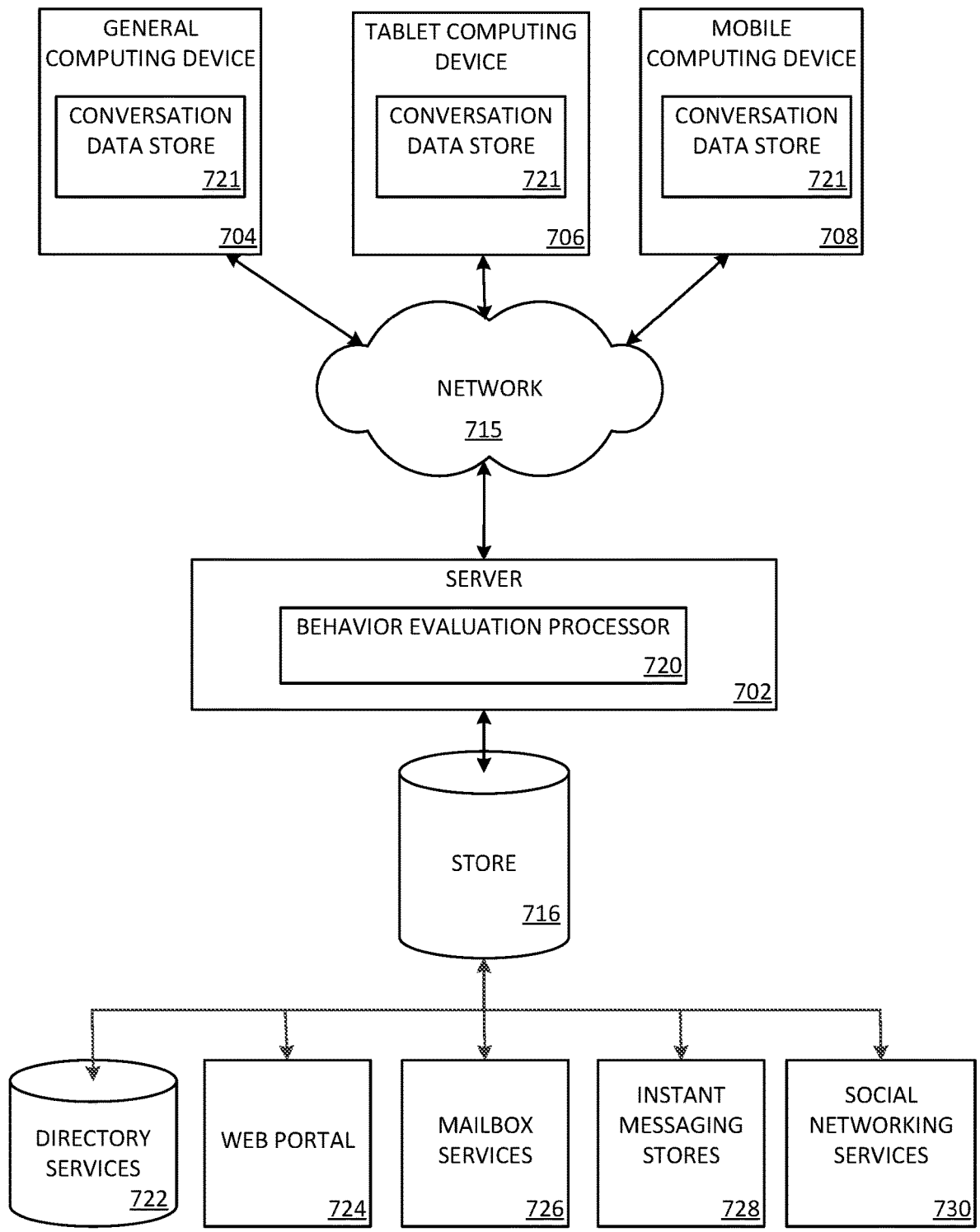
FIG. 7 is a simplified block diagram of a distributed computing system in which aspects of the present disclosure may be practiced.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 722, a web portal 724, a mailbox service 726, an instant messaging store 728, or a social networking site 730. Conversation data store 721 may be employed by a client that communicates with server device 702, and/or behavior evaluation processor 720 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these embodiments of the computing devices may obtain content from the store 716, in addition to receiving graphical data useable to be either pre-processed at a graphic-originating system, or post-processed at a receiving computing system.

Figure 8:
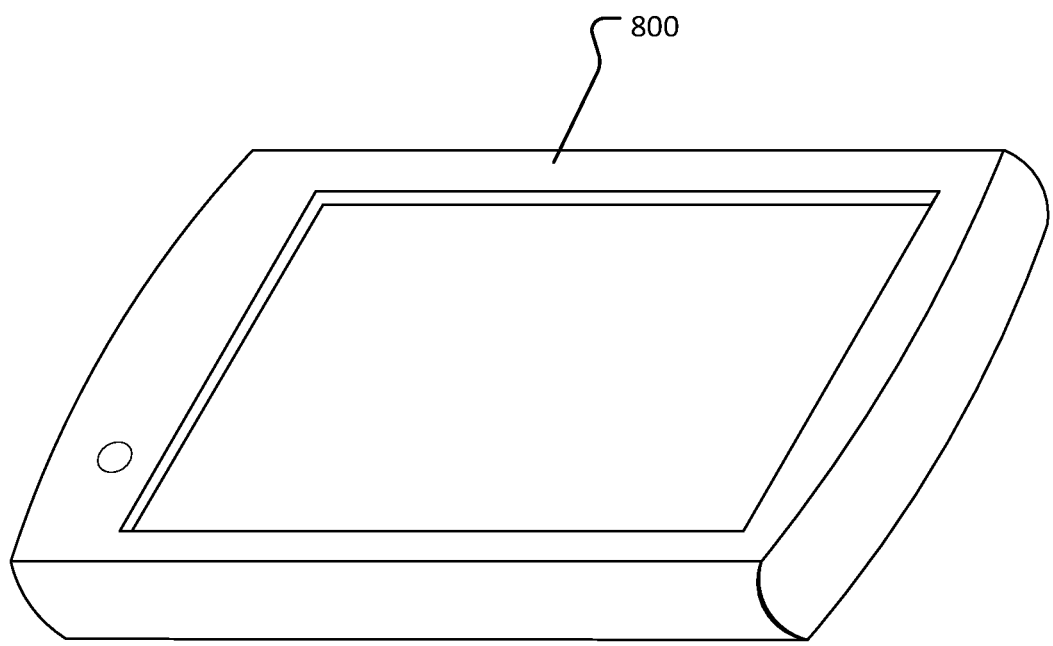
FIG. 8 illustrates a tablet computing device for executing one or more aspects of the present disclosure.

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, cause the system to perform a set of operations. The set of operations comprises: receiving, as part of a conversation session, a message from a user device, wherein the conversation session is between a user of the user device and an electronic conversational agent; determining, based on the message and one or more factors associated with the conversation session, a behavior measure associated with the user; determining, based on the behavior measure, whether the user is exhibiting anomalous behavior; when it is determined that the user is exhibiting anomalous behavior, automatically adapting the electronic conversational agent based on the determined anomalous behavior; and continuing the conversation session based on the adapted electronic conversational agent. In an example, determining the behavior measure comprises: computing one or more averages for the one or more factors; and generating the behavior measure based on an evaluation of the one or more averages using one or more thresholds. In another example, automatically adapting the electronic conversational agent based on the determined anomalous behavior comprises: identifying, from one or more potential responses to the message, a response associated with the determined anomalous behavior; and evaluating a reaction of the user to the response to determine whether the user continues to exhibit the determined anomalous behavior. In a further example, automatically adapting the electronic conversational agent based on the determined anomalous behavior comprises: providing a challenge to the user device, wherein the challenge comprises at least a first part and a second part, wherein the first part is associated with an expected response; receiving, from the user device, a challenge response, wherein the challenge response comprises a first response part associated with the first part and a second response part associated with the second part; and determining, based on comparing the first response part to the expected response, a validity for the second response part. In yet another example, the set of operations further comprises: receiving a second message from the user device; determining, based on the second message and one or more factors associated with the conversation session, a second behavior measure associated with the user; determining, based on the second behavior measure, whether the user continues to exhibit anomalous behavior; and when it is determined that the user does not exhibit anomalous behavior, adapting the electronic conversational agent to a normal state. In a further still example, the one or more factors associated with the conversation session comprise one or more factors associated with a previous conversation session between the user and the electronic conversational agent. In another example, the conversational session is an interview with the user.

In another aspect, the technology relates to a method for behavior evaluation of a user in a conversation session. The method comprises: receiving a message from a user device, wherein the conversation session is between the user and an electronic conversational agent; updating, based on the conversation session and one or more factors associated with the message, a behavior measure associated with the user; determining, based on the behavior measure, whether the user is exhibiting anomalous behavior; and when it is determined that the user is exhibiting anomalous behavior, providing an indication to the electronic conversational agent to adapt one or more future communications with the user device based on the determined anomalous behavior. In an example, updating the behavior measure comprises: computing one or more averages for the one or more factors; and generating the behavior measure based on an evaluation of the one or more averages using one or more thresholds. In another example, the indication to the electronic conversational agent comprises an indication to: identify, from one or more potential responses to the message, a response associated with the determined anomalous behavior; and evaluate a reaction of the user to the response to determine whether the user continues to exhibit the determined anomalous behavior. In a further example, the indication to the electronic conversational agent comprises an indication to: provide a challenge for the user to the user device, wherein the challenge comprises at least a first part and a second part, wherein the first part is associated with an expected response; receive, from the user device, a challenge response, wherein the challenge response comprises a first response part associated with the first part and a second response part associated with the second part; and determine, based on comparing the first response part to the expected response, a validity for the second response part. In yet another example, the method further comprises: receiving a second message from the user device; updating, based on the conversation session and one or more factors associated with the second message, the behavior measure associated with the user; determining, based on the behavior measure, whether the user continues to exhibit anomalous behavior; and when it is determined that the user does not exhibit anomalous behavior, providing an indication to the electronic conversational agent to enter a normal state. In a further still example, the one or more factors associated with the message comprise one or more factors associated with a previous message from at least one of the conversation session and a previous conversation session between the user and the conversational agent.

In a further aspect, the technology relates to another method for behavior evaluation of a user in a conversation session. The method comprises: receiving, as part of the conversation session, a message from a user device, wherein the conversation session is between the user and an electronic conversational agent; determining, based on the message and one or more factors associated with the conversation session, a behavior measure associated with the user; determining, based on the behavior measure, whether the user is exhibiting anomalous behavior; when it is determined that the user is exhibiting anomalous behavior, automatically adapting the electronic conversational agent based on the determined anomalous behavior; and continuing the conversation session based on the adapted electronic conversational agent. In an example, determining the behavior measure comprises: computing one or more averages for the one or more factors; and generating the behavior measure based on an evaluation of the one or more averages using one or more thresholds. In another example, automatically adapting the electronic conversational agent based on the determined anomalous behavior comprises: identifying, from one or more potential responses to the message, a response associated with the determined anomalous behavior; and evaluating a reaction of the user to the response to determine whether the user continues to exhibit the determined anomalous behavior. In a further example, automatically adapting the electronic conversational agent based on the determined anomalous behavior comprises: providing a challenge to the user device, wherein the challenge comprises at least a first part and a second part, wherein the first part is associated with an expected response; receiving, from the user device, a challenge response, wherein the challenge response comprises a first response part associated with the first part and a second response part associated with the second part; and determining, based on comparing the first response part to the expected response, a validity for the second response part. In yet another example, the method further comprises: receiving a second message from the user device; determining, based on the second message and one or more factors associated with the conversation session, a second behavior measure associated with the user; determining, based on the second behavior measure, whether the user continues to exhibit anomalous behavior; and when it is determined that the user does not exhibit anomalous behavior, adapting the electronic conversational agent to a normal state. In a further still example, the one or more factors associated with the conversation session comprise one or more factors associated with a previous conversational session between the user and the electronic conversational agent. In another example, the message was received in response to a prompt by the electronic conversational agent, and wherein the one or more thresholds are determined based on a confidence level associated with at least one of the message and the prompt.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
at least one processor; and
memory storing instructions that, when executed by the at least one processor, cause the system to perform a set of operations, the set of operations comprising:
receiving a message as part of a conversation session between a user and an electronic conversational agent;
analyzing the message using a historical factor associated with at least one other user of the electronic conversational agent to determine whether the user is exhibiting anomalous behavior;
when it is determined that the user is exhibiting anomalous behavior, automatically adapting the electronic conversational agent based on the determined anomalous behavior; and
continuing the conversation session based on the adapted electronic conversational agent.

2. The system of claim 1, wherein analyzing the message comprises:
computing an average for one or more factors associated with the conversation session; and
evaluating the average using one or more thresholds.

3. The system of claim 1, wherein automatically adapting the electronic conversational agent based on the determined anomalous behavior comprises:
identifying, from one or more potential responses to the message, a response associated with the determined anomalous behavior; and
evaluating a reaction of the user to the response to determine whether the user continues to exhibit the determined anomalous behavior.

4. The system of claim 1, wherein automatically adapting the electronic conversational agent based on the determined anomalous behavior comprises:
generating a challenge, wherein the challenge comprises at least a first part and a second part, wherein the first part is associated with an expected response;
receiving a challenge response, wherein the challenge response comprises a first response part associated with the first part and a second response part associated with the second part; and
determining, based on comparing the first response part to the expected response, a validity for the second response part.

5. The system of claim 1, wherein the set of operations further comprises:
receiving a second message of the conversation session;
analyzing the message to determine whether the user continues to exhibit anomalous behavior; and
when it is determined that the user does not exhibit anomalous behavior, adapting the electronic conversational agent to a normal state.

6. The system of claim 2, wherein the one or more factors associated with the conversation session comprise one or more factors associated with a previous conversation session between the user and the electronic conversational agent.

7. The system of claim 1, wherein the conversational session is an interview with the user.

8. A method for behavior evaluation of a user in a conversation session, comprising:
receiving a message, wherein the conversation session is between the user and an electronic conversational agent;
generating an updated behavior measure associated with the user based at least in part on the message and an existing behavior measure associated with the user;
determining, based on analyzing the updated behavior measure in relation to a historical factor associated with at least one other user of the electronic conversational agent, whether the user is exhibiting anomalous behavior; and
when it is determined that the user is exhibiting anomalous behavior, providing an indication to the electronic conversational agent to adapt a future communication with the user device based on the determined anomalous behavior.

9. The method of claim 8, wherein generating the updated behavior measure comprises:
updating an average for one or more factors associated with the conversation session based on the message; and
evaluating the average using one or more thresholds.

10. The method of claim 8, wherein the indication to the electronic conversational agent comprises an indication to:
identify, from one or more potential responses to the message, a response associated with the determined anomalous behavior; and
evaluate a reaction of the user to the response to determine whether the user continues to exhibit the determined anomalous behavior.

11. The method of claim 8, wherein the indication to the electronic conversational agent comprises an indication to:
provide a challenge for the user, wherein the challenge comprises at least a first part and a second part, wherein the first part is associated with an expected response;
receive a challenge response, wherein the challenge response comprises a first response part associated with the first part and a second response part associated with the second part; and
determine, based on comparing the first response part to the expected response, a validity for the second response part.

12. The method of claim 8, further comprising:
receiving a second message of the conversation session;
analyzing the message to determine whether the user continues to exhibit anomalous behavior; and
when it is determined that the user does not exhibit anomalous behavior, providing an indication to the electronic conversational agent to enter a normal state.

13. The method of claim 9, wherein the one or more factors associated with the message comprise one or more factors associated with a previous message from at least one of the conversation session and a previous conversation session between the user and the conversational agent.

14. A method for behavior evaluation of a user in a conversation session, comprising:
receiving a message as part of the conversation session between a user and an electronic conversational agent;
analyzing the message using a historical factor associated with a subset of other users of the electronic conversational agent to determine whether the user is exhibiting anomalous behavior;
when it is determined that the user is exhibiting anomalous behavior, automatically adapting the electronic conversational agent based on the determined anomalous behavior; and
continuing the conversation session based on the adapted electronic conversational agent.

15. The method of claim 14, wherein analyzing the message comprises:
computing an average for one or more factors associated with the conversation session; and
evaluating the average using one or more thresholds.

16. The method of claim 14, wherein automatically adapting the electronic conversational agent based on the determined anomalous behavior comprises:
identifying, from one or more potential responses to the message, a response associated with the determined anomalous behavior; and
evaluating a reaction of the user to the response to determine whether the user continues to exhibit the determined anomalous behavior.

17. The method of claim 14, wherein automatically adapting the electronic conversational agent based on the determined anomalous behavior comprises:
generating a challenge for the user, wherein the challenge comprises at least a first part and a second part, wherein the first part is associated with an expected response;
receiving a challenge response to the challenge, wherein the challenge response comprises a first response part associated with the first part and a second response part associated with the second part; and determining, based on comparing the first response part to the expected response, a validity for the second response part.

18. The method of claim 14, further comprising:

receiving a second message of the conversation session;

analyzing the message to determine whether the user continues to exhibit anomalous behavior; and when it is determined that the user does not exhibit anomalous behavior, adapting the electronic conversational agent to a normal state.

19. The method of claim 15, wherein the one or more factors associated with the conversation session comprise one or more factors associated with a previous conversational session between the user and the electronic conversational agent.

20. The method of claim 15, wherein the message was received in response to a prompt by the electronic conversational agent, and wherein the one or more thresholds are determined based on a confidence level associated with at least one of the message and the prompt.

* * * * *